United States Patent
Frenger et al.

(10) Patent No.: US 11,265,823 B2
(45) Date of Patent: *Mar. 1, 2022

(54) CONTROLLING ENERGY CONSUMPTION OF A WIRELESS NETWORK NODE

(71) Applicant: Telefonaktiebolaget LM Ericsson (publ), Stockholm (SE)

(72) Inventors: Pål Frenger, Linköping (SE); Bo Hagerman, Tyresö (SE); Bengt Lindoff, Bjärred (SE); Stefan Parkvall, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,228

(22) Filed: Jan. 23, 2020

(65) Prior Publication Data

US 2020/0163029 A1  May 21, 2020

Related U.S. Application Data

(60) Continuation of application No. 15/629,010, filed on Jun. 21, 2017, now Pat. No. 10,588,091, which is a (Continued)

(51) Int. Cl.
*H04W 52/28* (2009.01)
*H04W 52/34* (2009.01)
(Continued)

(52) U.S. Cl.
CPC .......... *H04W 52/28* (2013.01); *H04L 29/08* (2013.01); *H04W 52/0206* (2013.01);
(Continued)

(58) Field of Classification Search
CPC .......... H04W 52/28; H04W 72/0473; H04W 72/1278; H04W 52/0206; H04W 52/343;
(Continued)

(56) References Cited

U.S. PATENT DOCUMENTS 7,280,835 B2   10/2007 Usuda et al.
8,019,334 B2    9/2011 Koskela et al.
(Continued)

FOREIGN PATENT DOCUMENTS

JP   2002158609 A   5/2002
JP   2003037555 A   2/2003
(Continued)

OTHER PUBLICATIONS

Mitsubishi Electric, "Dynamic Setup on HNBs for Energy Savings and Interference Reduction", 3GPP TSG RAN WG3 Meeting #59bis,Shenzhen, China, Mar. 31, 2008, pp. 1-6, R3-080658, 3GPP, [Retrieved on Apr. 19, 2013], retrieved from internet: http://www.quintillion.co.jp/3GPP/TSG_RAN/TSG_RAN2008/TSG_RAN_WG3_lu3.html.
(Continued)

*Primary Examiner* — Steven H Nguyen
(74) *Attorney, Agent, or Firm* — Coats & Bennett, PLLC

(57) ABSTRACT

An arrangement for controlling energy consumption of a network node associated with a cell includes a terminal activity monitor configured to detect active terminals served by the cell. A transmission controller is connected to the terminal activity monitor and is configured to restrict transmission downlink in the cell during time periods when there are no active terminals served by the cell. During these time periods transmission is restricted to intermittent transmission of information assisting active terminals not served by the cell in finding the cell.

19 Claims, 9 Drawing Sheets

RECEIVE SIGNALS INDICATING TIME SCHEDULE FOR INTERMITTENT TRANSMISSION OF INFORMATION FROM A CELL  — S20

SYNCHRONIZE MOBILITY MEASUREMENTS WITH THE INTERMITTENT TRANSMISSION OF INFORMATION  — S21

Related U.S. Application Data division of application No. 14/700,460, filed on Apr. 30, 2015, now Pat. No. 9,730,166, which is a division of application No. 13/148,200, filed as application No. PCT/SE2009/050156 on Feb. 13, 2009, now Pat. No. 9,408,161.

(51) Int. Cl.

| | | |
|---|---|---|
| *H04W 52/02* | (2009.01) | |
| *H04L 65/40* | (2022.01) | |
| *H04W 72/04* | (2009.01) | |
| *H04W 72/12* | (2009.01) | |
| *H04W 36/22* | (2009.01) | |
| *H04W 88/08* | (2009.01) | |

(52) U.S. Cl.
CPC ..... *H04W 52/343* (2013.01); *H04W 72/0473* (2013.01); *H04W 72/1278* (2013.01); *H04W 36/22* (2013.01); *H04W 88/08* (2013.01); *Y02D 30/70* (2020.08)

(58) Field of Classification Search
CPC ...... H04W 88/08; H04W 36/22; H04L 29/08; Y02D 30/70
See application file for complete search history.

(56) References Cited

U.S. PATENT DOCUMENTS

| | | | |
|---|---|---|---|
| 8,045,513 B2 | 10/2011 | Kim et al. | |
| 8,095,143 B2 | 1/2012 | Amirijoo et al. | |
| 8,139,542 B2 | 3/2012 | Dong et al. | |
| 8,248,979 B2 | 8/2012 | Kleindl | |
| 8,837,303 B2 | 9/2014 | Yu et al. | |
| 2004/0043798 A1 | 3/2004 | Amerga et al. | |
| 2004/0116110 A1 | 6/2004 | Amerga et al. | |
| 2004/0132515 A1 | 7/2004 | Sunaga | |
| 2005/0043049 A1 | 2/2005 | Demir et al. | |
| 2005/0176427 A1 | 8/2005 | Roberts | |
| 2006/0116120 A1 | 6/2006 | Hurst | |
| 2006/0227855 A1 | 10/2006 | Xu et al. | |
| 2007/0097922 A1 | 5/2007 | Parekh et al. | |
| 2007/0129017 A1 | 6/2007 | Dalsgaard et al. | |
| 2007/0133479 A1 | 6/2007 | Montojo et al. | |
| 2007/0230394 A1 | 10/2007 | Wang et al. | |
| 2008/0057959 A1 | 3/2008 | Ida et al. | |
| 2008/0186892 A1 | 8/2008 | Damnjanovic | |
| 2008/0267105 A1 | 10/2008 | Wang et al. | |
| 2008/0267165 A1 | 10/2008 | Bertrand et al. | |
| 2008/0293426 A1 | 11/2008 | Kim et al. | |
| 2009/0005095 A1 | 1/2009 | Chun et al. | |
| 2009/0010190 A1 | 1/2009 | Gong | |
| 2009/0054055 A1 | 2/2009 | Iwamura et al. | |
| 2009/0180414 A1 | 7/2009 | Maeda et al. | |
| 2009/0180447 A1 | 7/2009 | Kim et al. | |
| 2009/0190538 A1 | 7/2009 | Hasegawa | |
| 2009/0239568 A1 | 9/2009 | Bertrand et al. | |
| 2009/0253461 A1 | 10/2009 | Kuwahara et al. | |
| 2009/0303927 A1 | 12/2009 | Kolding et al. | |
| 2010/0016005 A1 | 1/2010 | Sugawara et al. | |
| 2010/0029318 A1 | 2/2010 | Tano et al. | |
| 2010/0048212 A1 | 2/2010 | Yavuz et al. | |
| 2010/0061356 A1* | 3/2010 | Qvarfordt | H04W 48/08 370/338 |
| 2010/0067421 A1 | 3/2010 | Gorokhov et al. | |
| 2010/0074188 A1 | 3/2010 | Hsu | |
| 2010/0087197 A1 | 4/2010 | Iwamura et al. | |
| 2010/0111047 A1 | 5/2010 | Yang et al. | |
| 2010/0165835 A1 | 7/2010 | Hsu et al. | |
| 2010/0172276 A1 | 7/2010 | Aragon | |
| 2010/0265882 A1 | 10/2010 | Nagata et al. | |
| 2010/0278087 A1 | 10/2010 | Kawakami et al. | |
| 2011/0003592 A1 | 1/2011 | Matsumoto | |
| 2011/0009158 A1 | 1/2011 | Lee et al. | |
| 2011/0069677 A1 | 3/2011 | Lo et al. | |
| 2011/0085611 A1 | 4/2011 | Laroia et al. | |
| 2011/0128916 A1 | 6/2011 | Kwon et al. | |
| 2011/0136489 A1 | 6/2011 | Funnell et al. | |
| 2011/0223923 A1 | 9/2011 | Cho et al. | |
| 2011/0244867 A1 | 10/2011 | Zhao | |
| 2011/0256826 A1 | 10/2011 | Ode et al. | |
| 2011/0274072 A1 | 11/2011 | Michel et al. | |
| 2012/0100896 A1 | 4/2012 | Aoyama et al. | |
| 2012/0220329 A1 | 8/2012 | Kitazoe et al. | |
| 2012/0230321 A1 | 9/2012 | Obuchi et al. | |
| 2012/0250600 A1 | 10/2012 | Aragon et al. | |
| 2013/0028240 A1 | 1/2013 | Obuchi et al. | |

FOREIGN PATENT DOCUMENTS

| | | | |
|---|---|---|---|
| JP | 2004159078 A | 6/2004 | |
| JP | 2007202096 A | 8/2007 | |
| JP | 2008236436 A | 10/2008 | |
| RU | 2343635 C1 | 1/2009 | |
| RU | 2433572 C2 | 11/2011 | |
| WO | 2006130662 A2 | 12/2006 | |
| WO | 2007035447 A2 | 3/2007 | |
| WO | 2008001726 A1 | 3/2008 | |
| WO | 2008097965 A2 | 8/2008 | |
| WO | WO-2008131588 A1 * | 11/2008 | ......... H04J 11/0093 |

OTHER PUBLICATIONS

Khan, W. A., "Impact off DRX on VoIP Performance and Battery Life in LTE", Master's Thesis, Nov. 1, 2008, pp. 1-54.

NEC, "Location of DRX/DTX control functionality", TSG-RAN Working Group 2 #53, May 8, 2006, pp. 1-3, R2-061347, Shanghai, China.

* cited by examiner

CONTROLLING ENERGY CONSUMPTION OF A WIRELESS NETWORK NODE

This application is a continuation application of U.S. patent application Ser. No. 15/629,010, filed 21 Jun. 2017, which is a divisional application of U.S. patent application Ser. No. 14/700,460, filed 30 Apr. 2015, issued as U.S. Pat. No. 9,730,166, which is a divisional application of U.S. patent application Ser. No. 13/148,200, filed 5 Aug. 2011, issued as U.S. Pat. No. 9,408,161, which is a national stage application of PCT/SE2009/050156, filed 13 Feb. 2009, the disclosures of each of which are incorporated herein by reference in their entirety.

The present invention relates generally to controlling energy consumption of a wireless network node, such as a base station.

BACKGROUND

Energy consumption has long been an important issue for mobile terminals in cellular systems. Recent trends in green technology make it important to reduce the energy consumption also for the base stations (BS or NodeB) as the base station power consumption is a non-negligible part of the cost for the operator and excessive power consumption has a negative impact on the environment. Furthermore, the energy consumed as part of the base station operation generates heat, and active cooling (e.g. air conditioning) is typically required to control the temperature of the equipment. Active cooling will further add to the total energy consumption of a base station site. Similar comments apply to other wireless network nodes, such as relays and repeaters.

SUMMARY

An object of the present invention is to reduce the amount of energy used by a wireless network node.

This object is achieved in accordance with the attached claims.

Briefly, the basic idea of the present invention is to monitor the number of active terminals served by the cell. During time periods when there are no active terminals served by the cell, downlink transmission is restricted to intermittent transmission of information assisting active terminals not served by the cell in finding the cell.

In addition to reducing the energy consumption of the wireless network node, the present invention has the further advantage of reducing interference generated by the node.

The present invention is especially useful in cell scenarios where macro cells overlay micro cells and hence, in case of low load (no or few active cells in the micro cell area), idle terminals (in the micro cell area) can camp on the macro cells and hence use their sync symbols to be in sync with the network.

According to another aspect of the invention, a radio terminal receives signals indicating a time schedule for intermittent transmission of information from a cell and synchronizes mobility measurements with the intermittent transmission of information.

According to still another aspect of the invention, a radio terminal performs a first cell search over a multitude of frequencies, and then, if the first cell search fails, a second cell search in which the search duration on each frequency is extended.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described in detail with reference to an LTE (Long-Term Evolution) system. However, the same principles may also be used in other systems, such as WCDMA or GSM systems.

Furthermore, the present invention will primarily be described with reference to base stations, especially LTE base stations. However, the same principles may also be applied to other wireless network nodes, such as relays and repeaters and home base stations.

For the purposes of the present application a base station is assumed to serve one or more radio cells. Thus, "base station" also refers to more recent entities, such as NodeB and eNodeB (evolved NodeB), which are capable of handling more than one cell.

Similarly, "terminal" will be used to indicate different types of radio terminals, such as mobile stations, UEs (User Equipments), laptops, etc.

Figure 1:
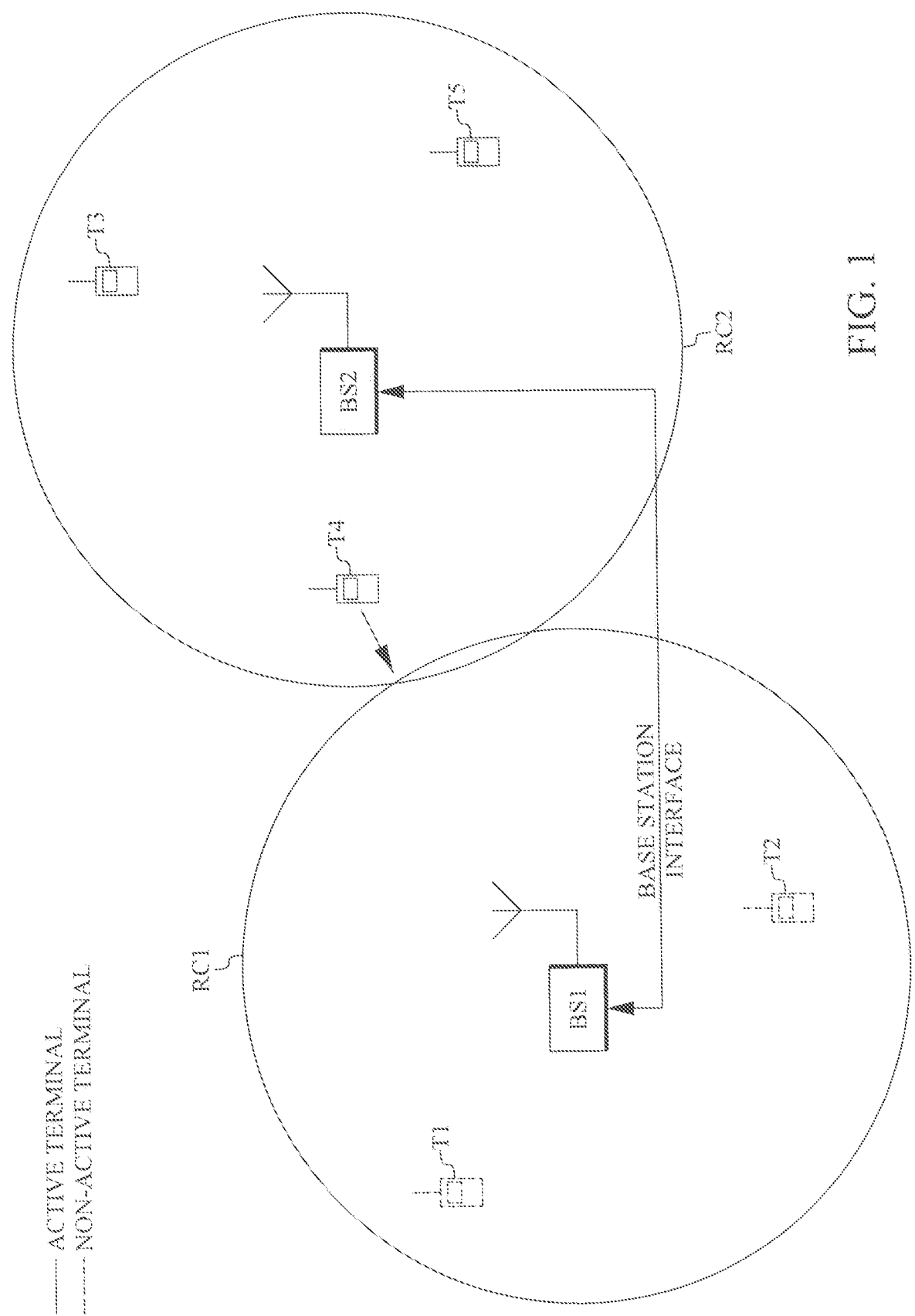
FIG. 1 is a scenario in which the present invention may be used.

FIG. 1 is a first scenario in which the present invention may be used. In this scenario adjacent radio cells RC1 and RC2 are managed by respective base stations BS1 and BS2.

Figure 2:
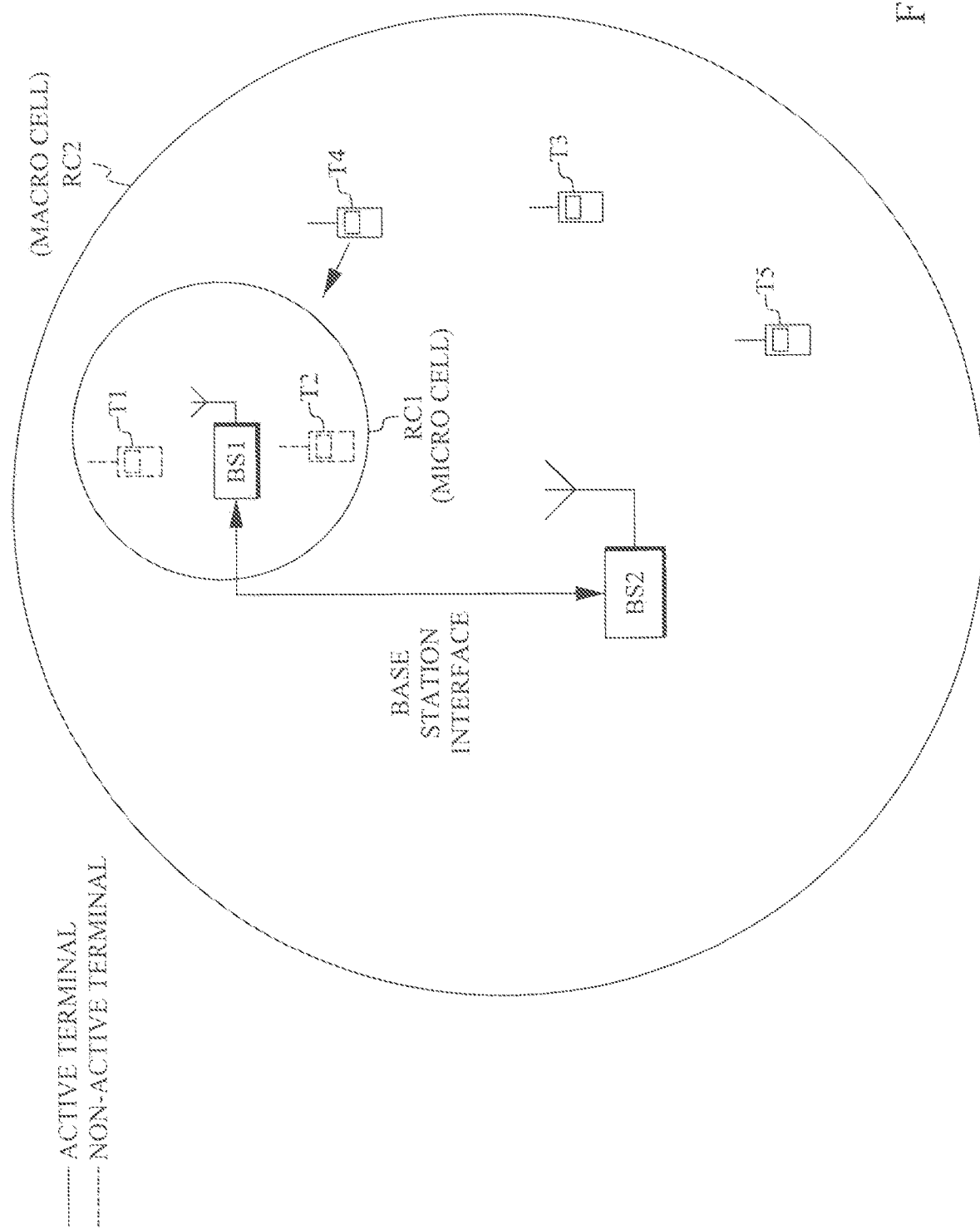
FIG. 2 is another scenario in which the present invention may be used.

FIG. 2 is another scenario in which the present invention may be used. In this scenario a micro cell managed by base station BS1 lies within the coverage area of a macro cell managed by base station BS2.

In current cellular systems, e.g. HSPA (High-Speed Packet Access) and LTE, the base stations continuously transmit certain forms of signals in the cell. Examples of such signals are reference signals (pilots), synchronization signals and the broadcast channel. These signals are used for many purposes:

Data reception: Active terminals need to perform channel estimation, typically based on the reference signals, to receive the transmitted data. The reference signals may also be used for estimation and reporting of the downlink channel quality to support base station functions such as channel-dependent scheduling.

Mobility cell search: Terminals regularly scan for neighboring cells. The synchronization signals transmitted in a neighboring cell are used to find and synchronize to a potential neighbor. Active terminals typically also report the received signal strength of reference signals (RSRP (Reference Signal Received Power) measurements) transmitted by the neighboring cells to the network, which takes a decision if the terminal should be handed over to the candidate cell.

Initial cell search: At power-up terminals try to find potential cells to connect to by scanning for synchronization signals. Once a cell is found and synchronization is obtained, the terminal reads the broadcast channel transmitted in the cell to obtain the necessary system information and performs a random access to connect to the network.

Terminal synchronization: Idle terminals need synchronization signals and/or reference signals (pilots) to be able to keep in sync with the network, i.e. once waking up from paging DRX (Discontinuous Reception) cycles, these signals are used to fine-tune timing and frequency errors etc.

When there are active users (terminals) in a cell, the cost of transmitting the signals discussed above is justified. However, when there are no active users in the cell, as in cell RC1 in FIGS. 1 and 2, there is in principle no need for these signals. This is especially true in scenarios with dense deployment of NodeBs, i.e. in case where "extra" (micro) cells are placed under macro cells, as in FIG. 2. In such scenarios, the micro cells are primarily used to cope with high load scenarios, and the energy spent on transmitting these signals from the micro cells in low load scenarios is in essence wasted.

In absence of active terminals in a cell, there is in principle no need to transmit anything. This allows the base station to turn off the power amplifier as well as the baseband processing. The cell would in essence be "idle" in the downlink. As the network knows which cells the active terminals are connected to, it is possible to identify idle cells. Once a terminal, such as T4 in FIGS. 1 and 2, moves into the area covered by the idle cell, the base station may wake up and resume transmission of signals. However, to determine if the cell should resume the transmission activity, it is necessary to detect if a terminal is moving into the idle cell. Such a terminal expects certain downlink signals (synchronization signals, reference signals, broadcast channels) to be present. Otherwise, it would not be able to find the cell. Similarly, if inactive terminals, such as terminals T1, T2 in FIGS. 1 and 2, become active, they must also be assisted in finding the cell.

Figure 3:
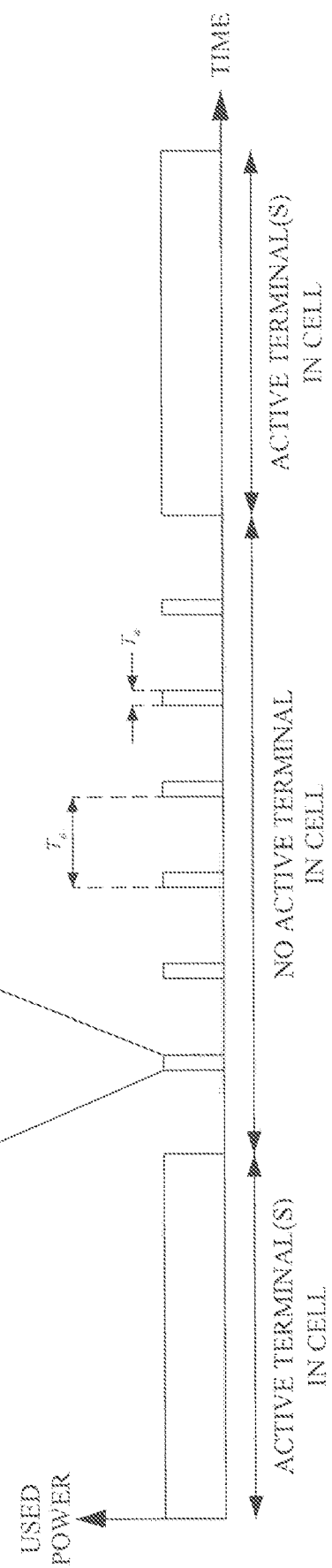
FIG. 3 is a time diagram illustrating an embodiment of discontinuous operation in accordance with the present invention.

Therefore, despite being in idle mode, the signals necessary for mobility and cell search should be intermittently transmitted. This can be accomplished by defining a DTX (Discontinuous Transmission) cycle for the base station. Typically, the DTX cycle is defined such that the base station is active every $T_a$ out of $T_p$ seconds as illustrated in FIG. 3. The energy reduction at the transmitter side is then approximately proportional to $T_a/T_v$.

The value of $T_a$ should be selected large enough to allow the terminal to find synchronization with sufficiently high probability as well as being able to do signal measurements on the cell. The time needed for this depends on the signal-to-noise ratio at the terminal, but if $T_a$ is in the order of a few hundred milliseconds the probability of not finding the idle cell is expected to be sufficiently low.

The value $T_p$ should be large enough to allow for efficient reduction in energy consumption. At the same time, a too large $T_p$ means that terminals may not find the idle cell. A typical value of $T_p$ could be in the order of several seconds or tens of seconds.

Preferably, the DTX pattern in the base station is selected to match the DRX pattern configured in the terminals. If the terminals wake up according to a certain pattern to perform neighboring cell measurements, it is beneficial if the DTX pattern in the base station matches this pattern.

In many cellular standards the synchronization signals are not transmitted continuously. For example, in LTE synchronization signals are transmitted in (part of) subframe 0 and 5 in each radio frame (for FDD, for TDD the subframes used are different but the principle remains the same). Similar rules typically apply for the broadcasted system information (in LTE, the most important part of the system information is transmitted in subframe 0 and 5). Hence, the active period of the DTX pattern could still allow the base station to sleep in the remaining subframes of a radio frame, as indicated by the expanded time segment $T_a$ in the top part of FIG. 3.

An idle cell would exit the DTX period when it detects that a terminal, for example T1 in FIG. 1 or 2, is attempting a random access. In addition, as handover is controlled by the network by sending commands to the terminals, the network can also wake up idle base stations in conjunction with the handover procedure. For example base station BS2 (managing cell RC2) commanding a terminal, for example T4 in FIG. 1 or 2, to perform handover from cell RC2 to cell RC1 (managed by base station BS1) would, in addition to the handover command to the terminal, also send a wake up command to base station BS1 over a base station interface, for example the X2 interface in LTE.

Figure 4:
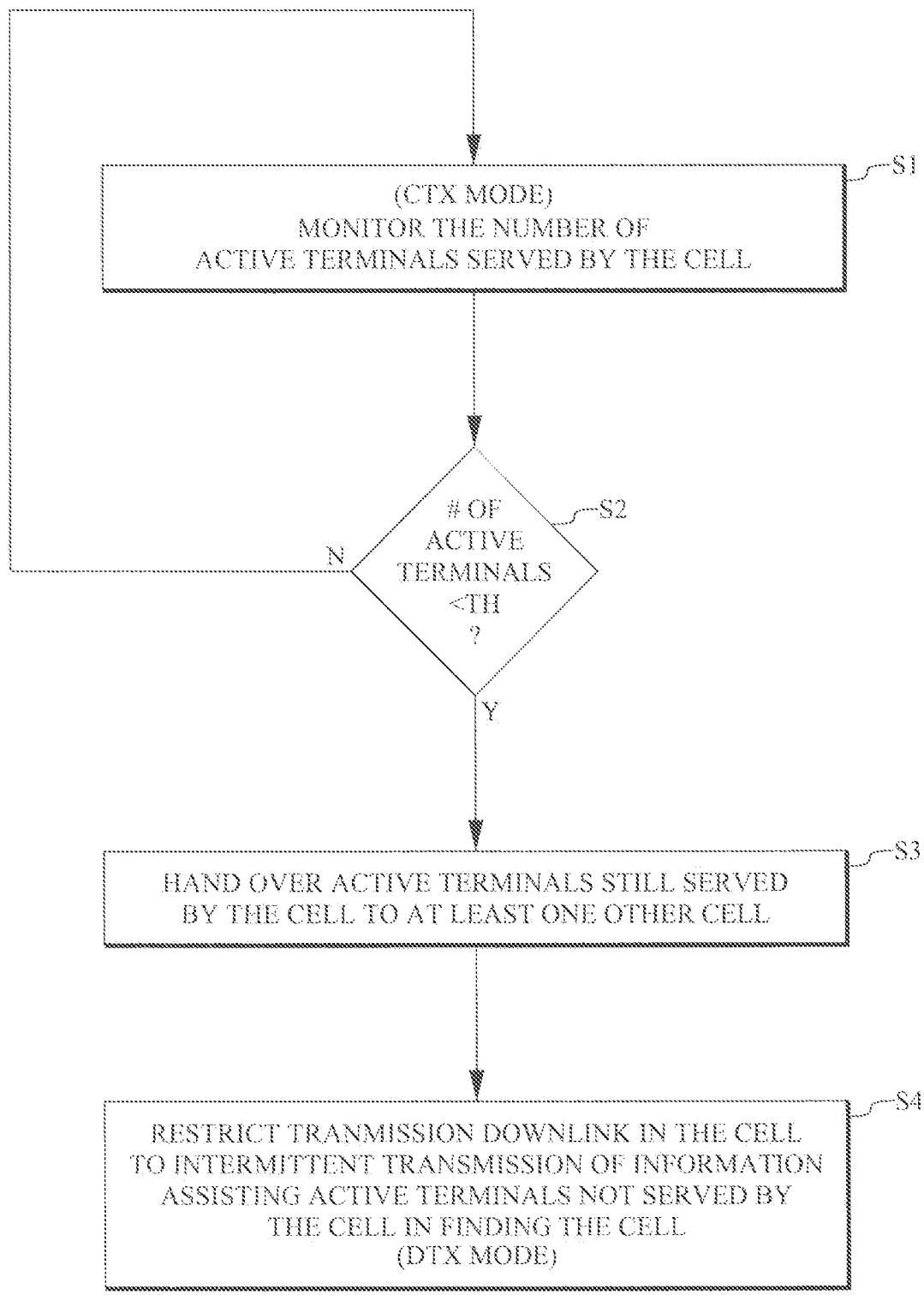
FIG. 4 is a flow chart illustrating an embodiment of the method of controlling energy consumption in accordance with the present invention.

FIG. 4 is a flow chart illustrating an embodiment of the method of controlling energy consumption in accordance with the present invention. In continuous transmission (CTX) mode step S1 monitors the number of active terminals served by the cell. Step S2 tests whether the number of active terminals served by the cell is less than a predetermined threshold TH. If so, step S3 hands over active terminals still served by the cell to at least one other cell (more than one cell may be required, depending on the location of the active terminals). When the active terminals have been handed over to other cells, step S4 instructs the base station managing the cell to enter a discontinuous transmission mode (DTX) in which transmission downlink in the cell is restricted to intermittent transmission of information assisting active terminals not served by the cell in finding the cell.

The threshold TH is set to, for example, a value representing between 0 and 5% of the maximum load the cell can handle. If the threshold TH is set to 0, step S3 may be omitted, since there are no remaining active terminals served by the cell.

In another embodiment step S3 is omitted even if there still are active terminals served by the cell. In this embodiment the remaining active terminals are forced to initiate handovers to other cells after the cell has already entered DTX mode. Since there is a risk that some terminals may not be handed over to another cell, for example due to high load in these cells, the threshold TH is typically set lower in this embodiment to minimize the risk of dropped connections. A combination of these embodiments, where the base station enters DTX mode as soon as the handover commands have been transmitted, is also possible.

Figure 5:
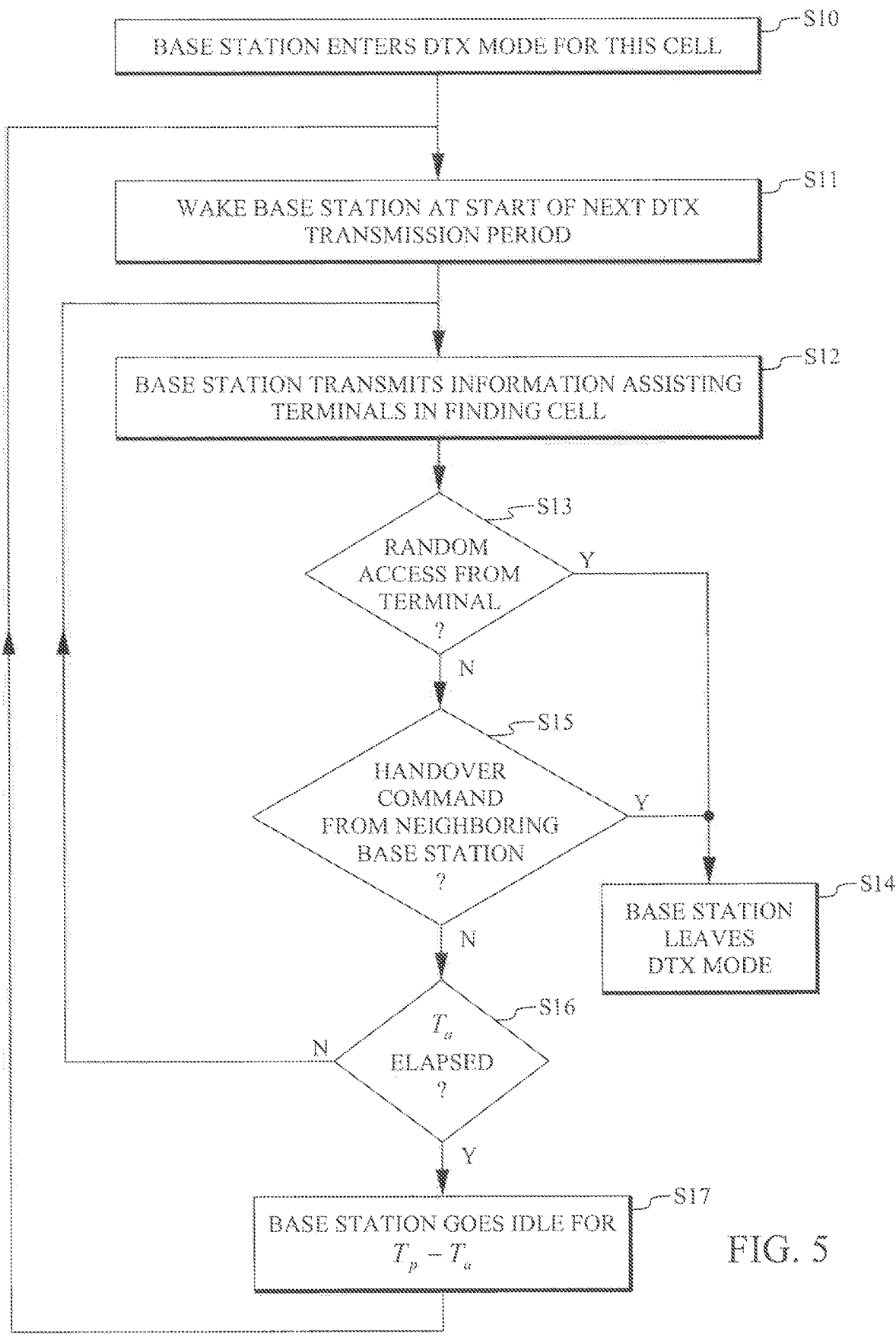
FIG. 5 is a flow chart illustrating further details of an embodiment of the method of controlling energy consumption in accordance with the present invention.

FIG. 5 is a flow chart illustrating further details of an embodiment of the method of controlling energy consumption in accordance with the present invention. In step S10 the base station enters DTX mode. This corresponds to step S4 in FIG. 4. Step S11 wakes the base station (for this cell) at the start of the next DTX transmission period. In step S12 the base station transmits information assisting terminals in finding the cell, corresponding to the first bar in the expanded upper part of FIG. 3. Step S13 detects whether there are any random access attempts from terminals. If so, step S14 instructs the base station to leave DTX mode, and to enter normal continuous mode. Otherwise step S15 detects whether any handover commands have been received from neighboring base stations. If so, step S14 instructs the base station to leave DTX mode, and to enter normal CTX mode. Otherwise the base station remains in DTX mode, and step S16 tests whether the time period $T_a$ has elapsed since the base station was wakened up. If not, the procedure returns to step S12 and starts the next transmission cycle, corresponding to the next bar in the upper part of FIG. 3. Otherwise the base station goes idle (in the downlink) during the time period $T_p$-$T_a$ in step S17, and then the procedure returns to step S11 to wake up the base station again.

A modification of the above flowchart includes allowing the cell to exit the DTX mode not only during the active period $T_a$ but at any time. This can be accomplished by including a test for handover commands from neighboring cells and/or random access attempts also in step S17.

When a base station enters DTX mode it may inform its neighbor cells of this fact. In this way the neighbor cells can decide to reject handover requests to the idle cell to reduce energy consumption in the system. In such an embodiment handover requests to the idle cell will be accepted only if a cell is congested or there is an apparent risk of losing a connection.

Figure 6:
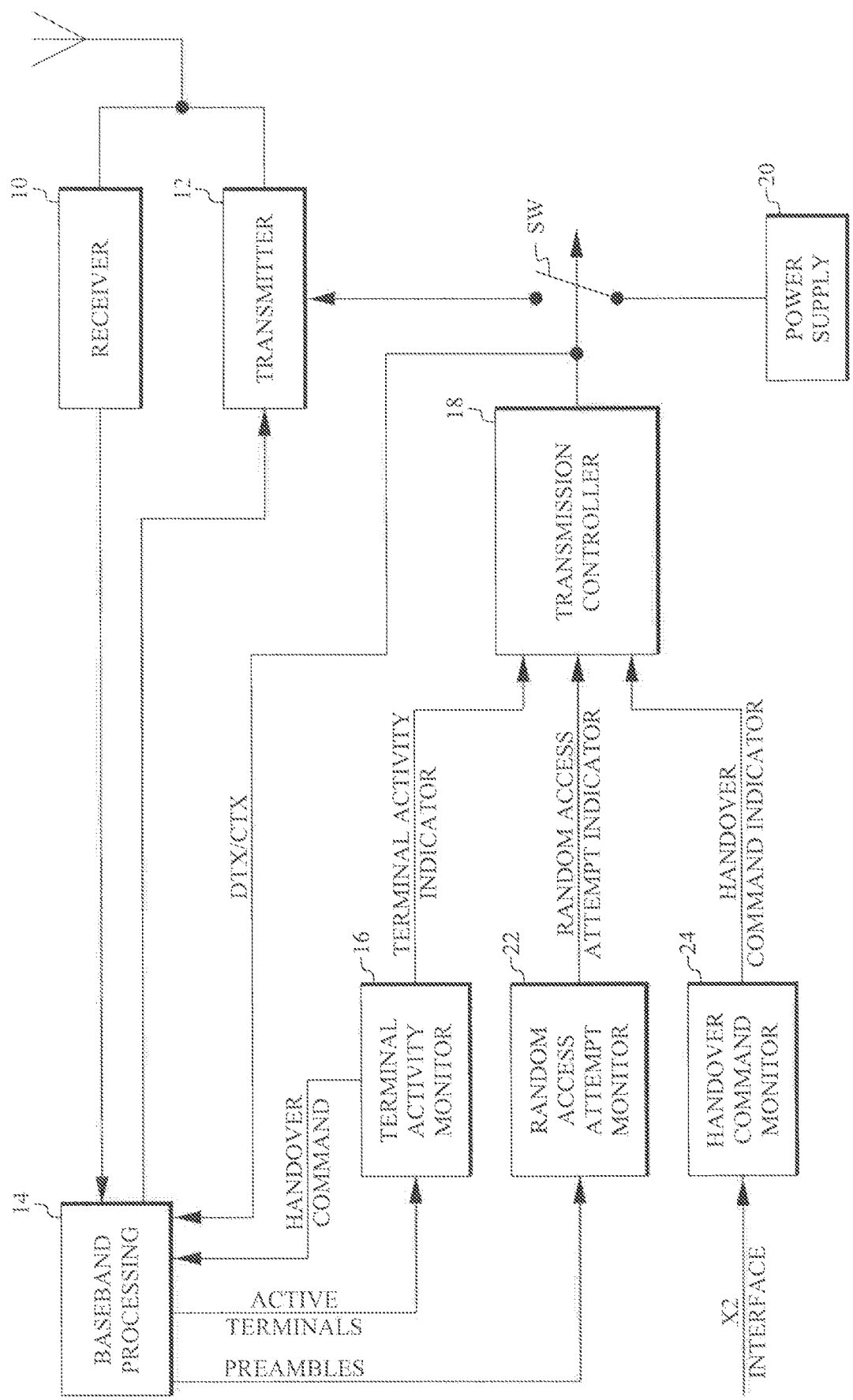
FIG. 6 is a block diagram illustrating an embodiment of an arrangement for controlling energy consumption of a wireless network node in accordance with the present invention.

FIG. 6 is a block diagram illustrating an embodiment of an arrangement for controlling energy consumption of a base station in accordance with the present invention. An antenna is connected to a transmitter 10 and a receiver 12, which are connected to a baseband processing unit 14. A terminal activity monitor 16 is connected to baseband processing unit 14 to receive a list of active terminals served by the cell. Active terminal monitor 16 determines the length of the list, and tests whether the number of active terminals is less than the threshold TH. If terminal activity monitor 20 detects that the number of active terminals served by the cell falls below the threshold TH, then a handover command is forwarded to baseband processing unit 14. This will hand the terminals on the active terminal list over to other cells. When the list is empty, terminal activity monitor 16 indicates this in a binary terminal activity indicator to a transmitter controller 18, which controls a switch SW that disconnects a power supply 20 from transmitter 10.

The arrangement in FIG. 6 also includes a random access monitor 22, which receives preambles from terminals that attempt random accesses during DTX mode. A random access attempt indicator is forwarded to transmission controller 18, which reconnects power supply 20 to transmitter 10 when a preamble is detected.

Furthermore, the arrangement in FIG. 6 includes a handover command monitor, which receives handover commands from other base stations, for example over the X2 interface, during DTX mode. A handover command indicator is forwarded to transmission controller 18, which reconnects power supply 20 to transmitter 10 when a handover request is detected.

The embodiment illustrated in FIG. 6 may optionally also include a DTX/CTX indicator back to baseband processing unit 14 to switch baseband processing between DTX and CTX mode. In this way unnecessary baseband signal processing can be avoided during DTX mode.

Terminal activity monitor 16 in FIG. 6 may also be configured to restrict transmission downlink when the number of active terminals served by the cell falls below the threshold, as discussed with reference to step S3 in FIG. 4.

The functionality of the various blocks in FIG. 6 is typically implemented by one or several micro processors or micro/signal processor combinations and corresponding software. Blocks 16, 18, 22, 24 may be integrated into baseband processing unit 14, which already has this type of hardware.

Figure 7:
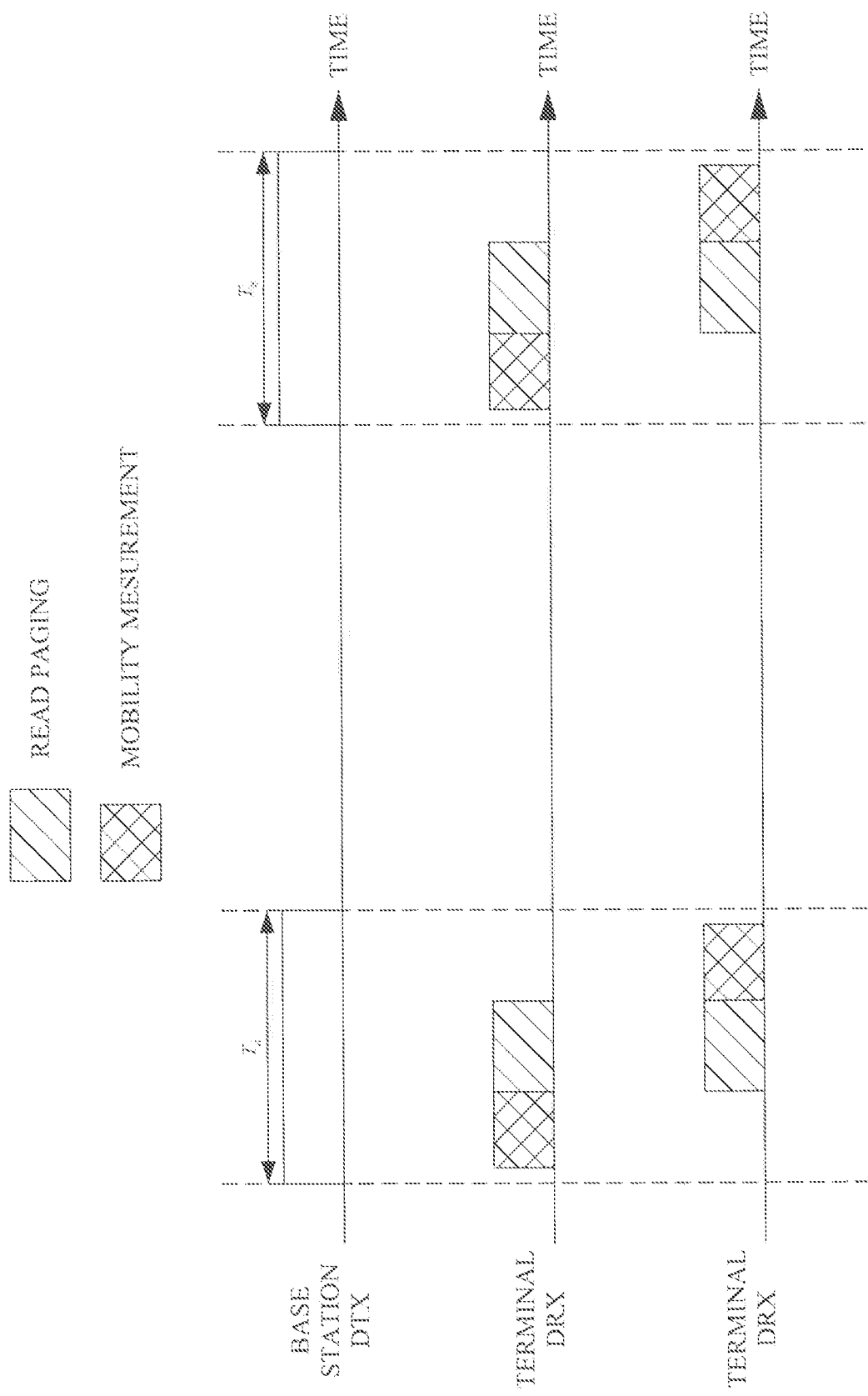
FIG. 7 is a time diagram illustrating synchronization of paging in a terminal with intermittent transmission in a base station.

As noted above, there are three types of information that the idle base station may transmit in DTX mode to assist a terminal in finding the cell, namely reference (pilot) signals, synchronization signals and broadcasted system information. At least one of these has to be transmitted during the time periods $T_a$ in FIG. 3. Several procedures may be performed by the network and the terminals to facilitate the correct reception of this information:

An inactive terminal periodically listens to a paging channel (terminal DRX mode). Typically the terminal performs mobility measurements either just before or just after listening to the paging channel. This feature can be used to let an active non-serving base station (the terminal is inactive, so it is not served by any base station, it only listens to the paging channel) synchronize the DRX mode of the terminal with the time periods $T_a$ when the base station in intermittent mode transmits, as illustrated in FIG. 7.

An active terminal, which can perform mobility measurements at any time, may be instructed by a base station to perform measurements at time instants that lie in time periods T of a base station in DTX mode. This functionality can be obtained in existing terminals by a firmware update.

Figure 8:
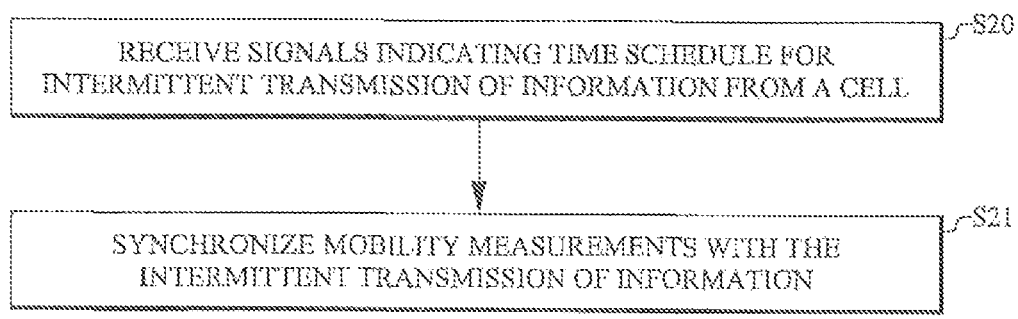
FIG. 8 is a flow chart illustrating an embodiment of a method of operating a radio terminal in accordance with one aspect of the present invention.
Figure 9:
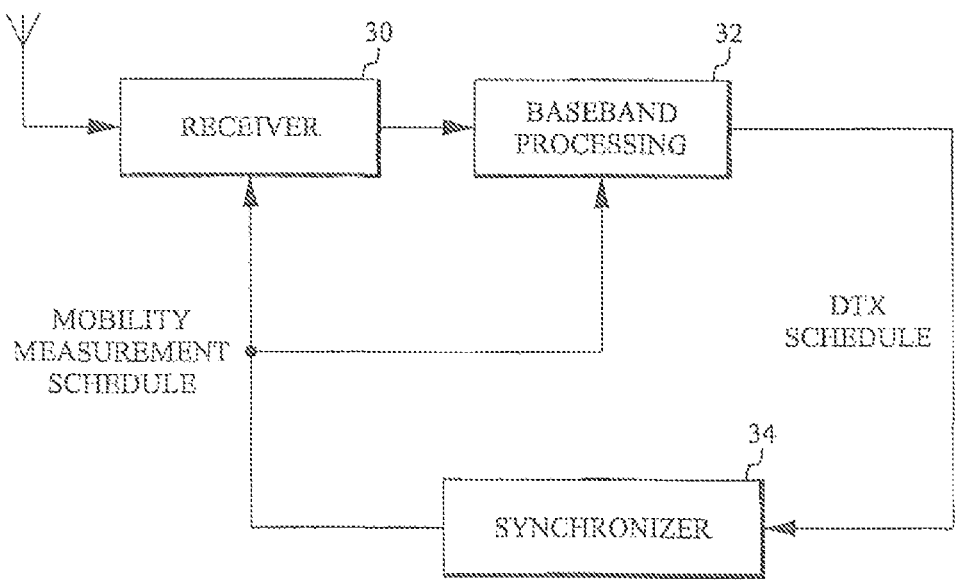
FIG. 9 is a block diagram illustrating an embodiment of a radio terminal in accordance with one aspect of the present invention.

FIGS. 8 and 9 illustrate an embodiment of this aspect of the present invention. In FIG. 8 step S20 receives signals indicating a time schedule for intermittent transmission of information from a cell. Step S21 synchronizes mobility measurements with the intermittent transmission of information. If the terminal is active, the terminal is instructed to synchronize the mobility measurements with the intermittent transmission. On the other hand, if the terminal is inactive, it is instead instructed to listen to the paging channel during transmission periods of the intermittent transmission. In this way the mobility measurements are indirectly synchronized with the intermittent transmissions.

The radio terminal illustrated in FIG. 9 includes an antenna connected to a receiver 30, which forwards baseband signals to a baseband processing unit 32. Baseband processing unit 32 extracts, among other signals, the DTX schedule of an idle base station. This schedule has been received from an active base station, either directly as an actual DTX schedule if the terminal is active, or indirectly as a paging schedule if the terminal is inactive. The DTX schedule is forwarded to a synchronizer 34, which controls the mobility measurement schedule of the receiver 30 and baseband processing unit 32. If desirable synchronizer 34 may be integrated into unit 32.

The network can synchronize the DTX mode of several base stations. Both local (base station to base station) and centralized (via the Operations Support System, OSS) synchronization is possible.

Terminals may be provided with a two step cell search procedure. In the first step the terminal performs a normal cell search scanning over a multitude of frequencies. If this fails, the terminal performs an extended cell search in which the search duration on each frequency is extended (i.e. longer than the idle time period $T_p-T_a$ of base stations in DTX mode). This functionality can be obtained in existing terminals by a firmware update.

Figure 10:
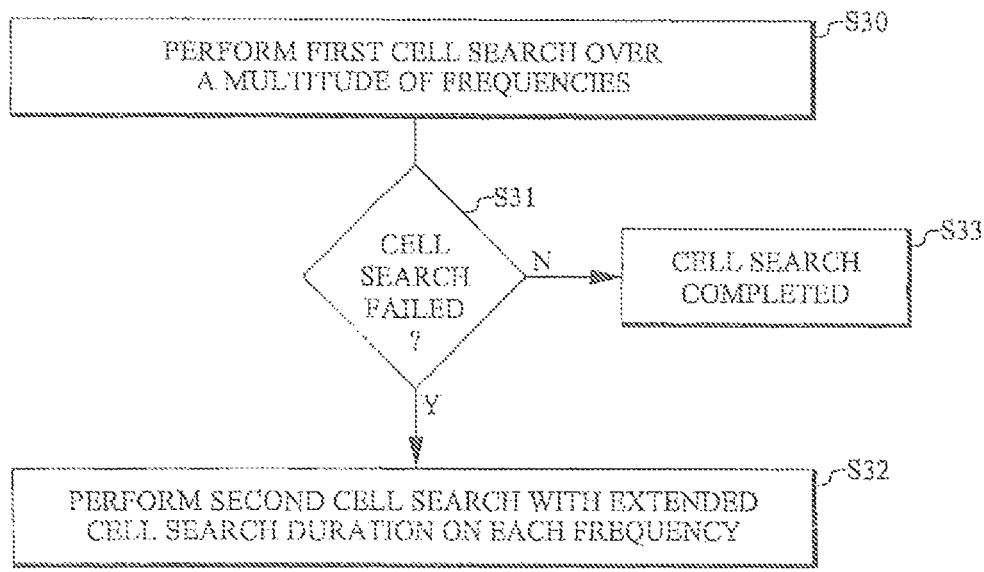
FIG. 10 is a flow chart illustrating an embodiment of a method of operating a radio terminal in accordance with another aspect of the present invention.
Figure 11:
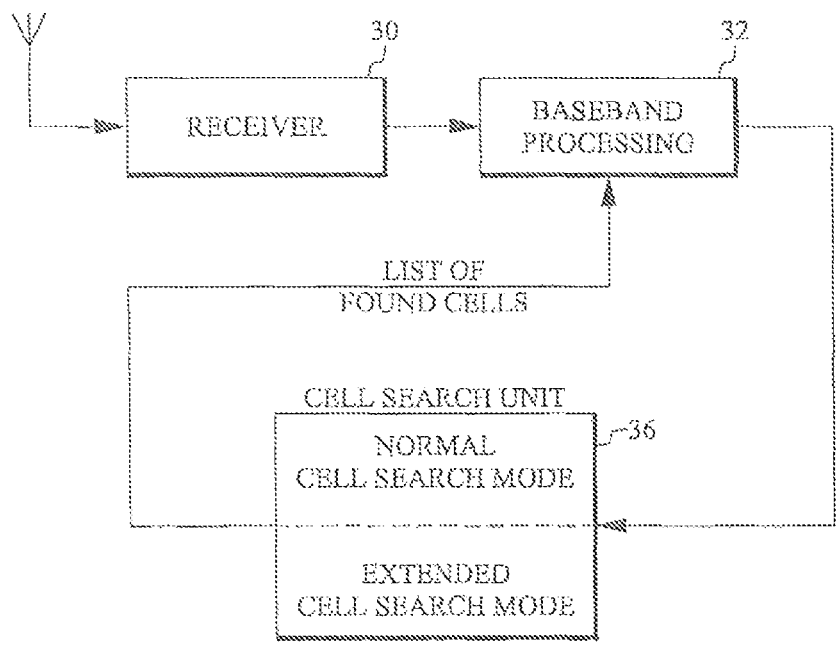
FIG. 11 is a block diagram illustrating an embodiment of a radio terminal in accordance with another aspect of the present invention.

FIGS. 10 and 11 illustrate an embodiment of this aspect of the present invention. In FIG. 10 step S30 performs a first, normal cell search over a multitude of frequencies. Step S31 tests whether the cell search failed, i.e. whether the search failed to find any cells. If so, a second cell search with an extended cell search duration on each frequency is performed in step S32. Otherwise the cell search is completed in step S33.

FIG. 11 is a block diagram of a radio terminal incorporating this two-step cell search. It includes an antenna connected to a receiver 30, which forwards baseband signals to a baseband processing unit 32, which is connected to a cell search unit 36. Cell search unit 36 implements two cell search modes, namely a normal cell search mode and an extended cell search mode, and is configured to perform the cell search procedure described with reference to FIG. 10. It outputs a list of found cells to baseband processing unit 32. If desirable unit 36 may be integrated into unit 32.

Reference signals and synchronization signals are primarily designed for different purposes, but during idle mode operation they could have more or less the same function. UEs that are not served by the idle eNodeB use these signals to find the cell and to measure the signal strength. Since synchronization signals are designed to be easily detected they are beneficial to use for this purpose also during eNodeB idle mode. However it would be possible to only transmit reference signals from an idle eNodeB, and with somewhat more effort the UEs would eventually find such a transmission and measure on it. It would also be possible to only transmit the synchronization signals during eNodeB idle mode operation. In that case the UE would have to estimate the signal strength based on measurements on synchronization channels. However, synchronization channels are not primarily designed for this purpose and the accuracy of such measurements would be slightly lower. Therefore the preferred operation would be to transmit both synchronization signals as well as reference signals also during eNodeB idle mode operation.

Regarding the broadcast channel a UE could potentially detect such a transmission from an idle eNodeB even if synchronization signals and reference signals were not transmitted, but it would result in degraded performance and longer cell search durations. Theoretically it would be possible for the UEs to determine the signal strength of an idle eNodeB based only on measurements on the broadcast channel. The broadcast channel carries the information that the UE needs in order to perform a random access, but it is possible to let the UE receive this information from a macro cell that encloses the idle cell instead. In a preferred embodiment all three types of signals (i.e. synchronization, reference and broadcast) are transmitted from an eNodeB in idle mode, but theoretically it is sufficient if only one of the signals are transmitted.

It will be understood by those skilled in the art that various modifications and changes may be made to the present invention without departure from the scope thereof, which is defined by the appended claims.

Abbreviations

BS Base Station
DRX Discontinuous Reception
DTX Discontinuous Transmission
eNodeB evolved NodeB
HSPA High-Speed Packet Access
LTE Long-Term Evolution
NodeB A logical node handling transmission/reception in multiple cells
OSS Operations Support System
RSRP Reference Signal Received Power
UE User Equipment

What is claimed is:

1. A method of operating a wireless network node associated with a cell, the method comprising:
   sending, to a user equipment (UE), a signal indicating a time schedule for intermittent transmission of information from the cell, wherein the intermittent transmission of the information enables the UE to perform mobility measurements when the cell is in a discontinuous transmission mode and the UE is an active terminal not served by the cell;
   restricting transmission downlink in the cell to intermittent transmission of the information in a discontinuous transmission cycle;
   wherein the discontinuous transmission cycle comprises a non-transmission period and a transmission period; and
   wherein the information is information assisting active terminals not served by the cell in finding the cell and performing mobility measurements.

2. The method of claim 1, further comprising resuming transmission activity to enter a continuous transmission mode of the cell.

3. The method of claim 2 wherein the resuming transmission activity is due to a random access attempt from a terminal not served by the cell.

4. The method of claim 2 wherein the resuming transmission activity is due to a handover command.

5. The method of claim 1 wherein a coverage area of the cell lies within a coverage area of another cell.

6. The method of claim 5 wherein the cell is a micro cell in a macro cell.

7. The method of claim 5 wherein the wireless network node is a base station or a home base station.

8. The method of claim 1 wherein the intermittent transmission of information includes:
   transmission of reference signals; and/or
   transmission of synchronization signals; and/or
   transmission of broadcast information.

9. The method of claim 1 further comprising synchronizing the intermittent transmission of information between several network nodes.

10. A base station associated with a cell, said base station comprising:
    a transmission controller configured to:
       send, to a user equipment (UE), a signal indicating a time schedule for intermittent transmission of information from the cell, wherein the intermittent transmission of information enables the UE to perform mobility measurements when the cell is in a discontinuous transmission (DTX) mode and the UE is an active terminal not served by the cell;

restrict transmission downlink in the cell to intermittent transmission of the information in a discontinuous transmission cycle, the discontinuous transmission cycle comprising a non-transmission period and a transmission period, and where the information is information assisting active terminals not served by the cell in finding the cell and performing mobility measurements.

11. The base station of claim 10 wherein the transmission controller is further configured to leave intermittent transmission and resume transmission activity to enter a continuous transmission mode of the cell.

12. The base station of claim 11 wherein the transmission controller is configured to leave the intermittent transmission responsive to a random access attempt from a terminal not served by the cell.

13. The base station of claim 11 wherein the transmission controller is configured to leave the intermittent transmission responsive to a handover command.

14. A system comprising:
a radio terminal; and
a base station associated with a cell, the base station comprising a transmission controller configured to:
send, to the radio terminal, a signal indicating a time schedule for intermittent transmission of information from the cell, wherein the intermittent transmission of the information enables the radio terminal to perform mobility measurements when the cell is in a discontinuous transmission mode and the radio terminal is an active terminal not served by the cell;
restrict transmission downlink in the cell to intermittent transmission of the information in a discontinuous transmission cycle, the discontinuous transmission cycle comprising a non-transmission period and a transmission period, wherein the information is information assisting active terminals not served by the cell in finding the cell and performing mobility measurements; and
wherein the radio terminal is configured to:
receive the signal indicating the time schedule from the base station; and
perform a mobility measurement assisted by the intermittent transmission of the information from the cell; and
report the mobility measurement.

15. The system of claim 14, wherein the radio terminal is further configured to receive continuous transmission from the cell when the cell resumes transmission of signals.

16. The system of claim 15, wherein the cell resumes transmission of signals based on the radio terminal performing one or more of a random access procedure and a handover procedure.

17. A method of operating a system that comprises a base station associated with a cell and a radio terminal, the method comprising:
sending, to a radio terminal, a signal indicating a time schedule for intermittent transmission of information from the cell, wherein the intermittent transmission of the information enables the radio terminal to perform mobility measurements when the cell is in a discontinuous transmission mode and the radio terminal is an active terminal not served by the cell;
restricting, by the base station, transmission downlink in the cell to intermittent transmission of the information in a discontinuous transmission cycle, the discontinuous transmission cycle comprising a non-transmission period and a transmission period, wherein the information is information assisting active terminals not served by the cell in finding the cell and performing mobility measurements;
performing, by the radio terminal, a mobility measurement assisted by the intermittent transmission of the information from the cell; and reporting, by the radio terminal, the mobility measurements.

18. The method of claim 17, further comprising receiving, by the radio terminal, continuous transmission from the cell when the cell resumes transmission of signals.

19. The method of claim 18, wherein the cell resumes transmission of signals based on the radio terminal performing one or more of a random access procedure and a handover procedure.

* * * * *

UNITED STATES PATENT AND TRADEMARK OFFICE
CERTIFICATE OF CORRECTION

PATENT NO. : 11,265,823 B2
APPLICATION NO. : 16/750228
DATED : March 1, 2022
INVENTOR(S) : Frenger et al.

Page 1 of 1

It is certified that error appears in the above-identified patent and that said Letters Patent is hereby corrected as shown below:

On the Title Page

In Item (60), in Column 1, delete "(60)" and insert -- (63) --, therefor.

In the Specification

In Column 4, Line 3, delete "$T_a/T_v$." and insert -- $T_a/T_p$. --, therefor.

In Column 6, Line 45, delete "T" and insert -- $T_a$ --, therefor.

Signed and Sealed this
Nineteenth Day of December, 2023

*Katherine Kelly Vidal*
Katherine Kelly Vidal
*Director of the United States Patent and Trademark Office*